Sept. 24, 1929.  A. O. ABBOTT, JR  1,729,468
VALVE TAPPET CONSTRUCTION
Filed June 21, 1928
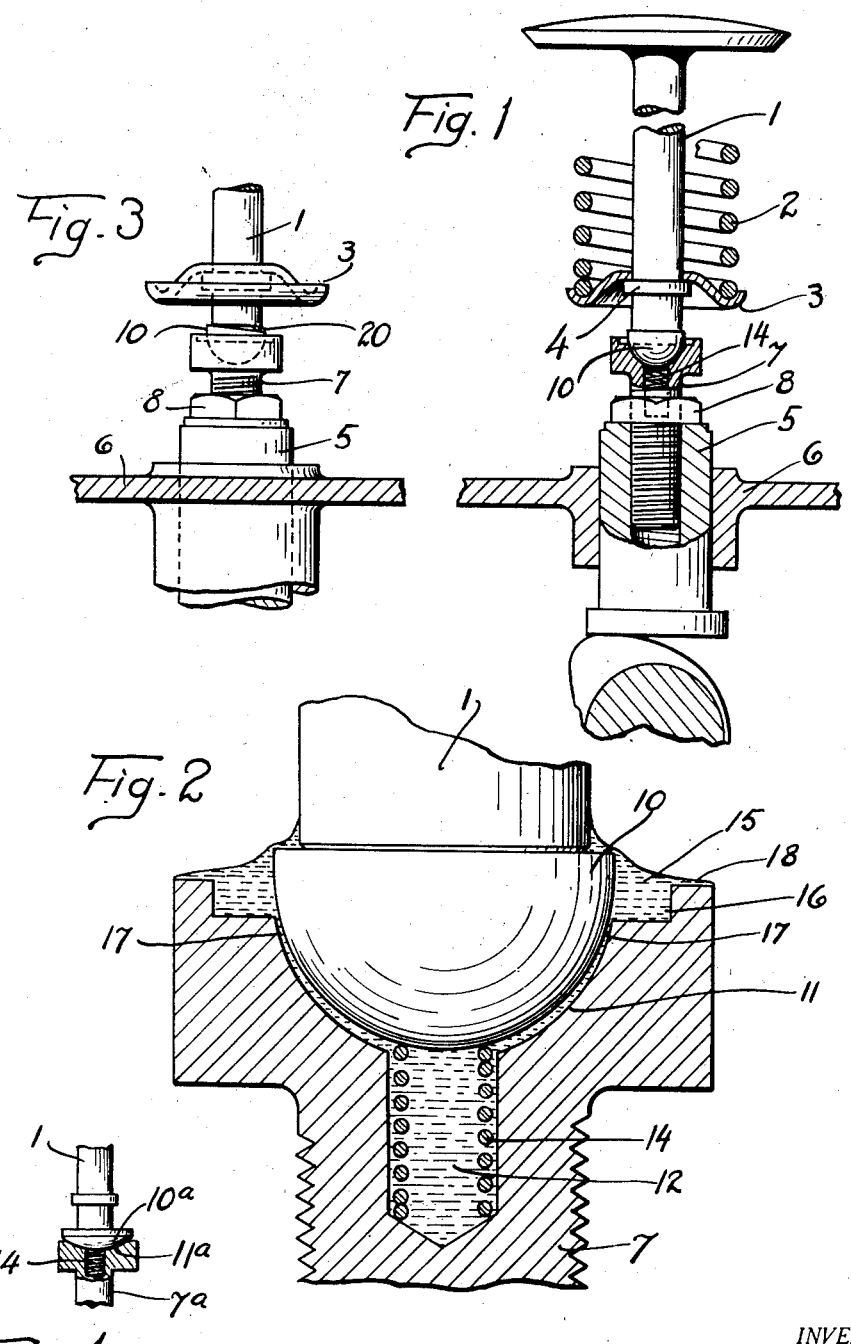
INVENTOR.
Adrian O. Abbott Jr.
BY
ATTORNEY.

Patented Sept. 24, 1929

1,729,468

UNITED STATES PATENT OFFICE

ADRIAN O. ABBOTT, JR., OF GROSSE POINTE PARK, MICHIGAN

VALVE-TAPPET CONSTRUCTION

Application filed June 21, 1928. Serial No. 287,194.

This invention relates to valve operating mechanism, and it has to do especially with an improvement in a valve tappet construction which is primarily useful in conjunction with poppet valves used largely in internal combustion engines.

The invention contemplates a tappet construction which will effect an improved manner of operation, and in this regard one of the primary features is that of quietness in operation. There are, however, other features of the invention, among which may be mentioned the fact that the clearance adjustment can be readily made, and that when once made such an adjustment is maintained over a long period of time. Moreover, the mechanism is effective over a wide range of clearance adjustments, and the construction is such as to compensate for the expansion of parts upon becoming heated. Other features of the invention will appear as the description progresses.

According to the invention a ball and socket type of tappet construction is provided, in conjunction with a fluid for cushioning the blow between the separated parts when the valve mechanism operates to actuate the valve. The mechanism can be used with the conventional cam construction for operating the valve, and in its operation the clearance is effected by the ball rising out of the socket and the fluid acts as a cushion between the socket and ball when the cam actuates the valve.

In the accompanying drawings:

Fig. 1 is a sectional view taken through the construction showing the general arrangement of the parts.

Fig. 2 is an enlarged section illustrating how the ball and socket member function in connection with the fluid cushion.

Fig. 3 is a side elevation illustrating, in an exaggerated manner, how the construction automatically takes care of the inaccuracies in the contact with the valve stem and the tappet.

Fig. 4 is a view illustrating the modified form.

In the accompanying drawings the stem of a poppet type valve is shown at 1, the same being provided with suitable spring 2 for holding the valve on its seat. The spring may be associated with the valve stem by means of a washer-like member 3 retained on the valve stem by a collar 4.

A push rod for the valve is shown at 5, the lower end of which may be in association with an open cam, and this tappet is slidably held by a suitable part of the engine construction, as shown at 6. A tappet adjusting screw is referenced 7 which may be held in adjusted position by lock nut 8.

As best shown in Fig. 2, the stem 1 does not make direct contact with the tappet adjusting screw as there is interposed between the stem and the screw a member 10 which will hereafter be termed, for convenience, a ball member. A suitable socket construction is provided for this ball, and for this purpose the tappet screw may be provided with a socket 11. This socket may be provided directly in the upper end of the tappet screw which may be of sufficient size for the purpose, or if it is found to be convenient, a separate socket member may be employed which is in turn attached in some manner to the tappet screw.

This socket and ball of the construction illustrated in the drawings are arranged to have relative movement in the operation of the construction, which movement is effected by reason of the necessary clearance between the push rod and the valve stem. The valve stem is not connected to the ball member but merely contacts with the upper flat surface of the ball. Thus, in order to insure that relative movement takes place between the ball and socket, the socket may be provided with a well 12 in which is disposed spring 14.

In the normal operation of such a tappet construction, the cam raises the tappet 5 which, after it has been raised a distance equal to the clearance between the tappet and the valve stem, contacts with the valve stem and raises the valve against the action of the spring 2. When the cam permits the tappet to lower, the valve closes under the action of the spring. Ordinarily there is about .007 of an inch clearance between the valve tappet and the valve stem, and the conventional tappet noise is caused by the valve tappet rising up and striking the valve stem.

In the present construction the usual clearance between the tappet and stem takes place between the ball and socket, as above described. This is effected by reason of the spring 14 holding the ball member up against the valve stem and in contact therewith. Accordingly, when the push rod is raised by the cam, the tappet rises and the spring 14 is compressed until the ball seats in the socket whereupon the valve stem is raised. All internal combustion engines used in automotive vehicles, with which applicant is familiar, lubricate in one way or another this valve mechanism; some lubricate merely by oil vapors, others by gravity flow of oil, and others by positive pump system. The present invention is designed to take advantage of this lubricating oil and use the same as a cushioning fluid.

It has been found in actual practice that the oil accumulates much after the manner effected in Fig. 2 wherein the accumulation of oil is shown at 15, and this oil fills the socket member and also, incidentally fills the well. The oil collects around the edge of the socket and piles up, so to speak, upon the top edge 18 of the tappet adjusting screw.

In Fig. 2 the parts are shown in the position which they assume when the valve is closed, this being during the dwell period of the cam. At this time the oil which has accumulated, as shown, fills the clearance space between the ball and the socket. It is thought that the oil flows in between the ball and socket not alone by gravity but that the flow is aided by the partial vacuum produced when the ball rises up from the socket under the action of spring 14. When the tappet again raises the valve, the oil forms a cushion between the ball and socket thus eliminating the metallic tappet noise.

It will here be noted that at the point referenced 17 the space between the ball and the walls of the socket is relatively narrow thus providing a restriction to the flow of the oil out from between the ball and socket when the two members are brought together. This aids in insuring an oil film of substantial thickness at the time the ball and socket are brought together wherein the escape of the oil is more or less retarded. This restriction is effected by reason of the ball and socket being substantially hemispherical, and the groove 16 is provided primarily for regulating this restriction, as it will be appreciated that the deeper the groove the less the restriction. This groove also aids in retaining the accumulation of oil.

The proposition of the restriction at 17 preventing the flow of oil back in between the ball and socket when they are separated, more or less naturally presents itself. However, the dwell period of the cam, that is, the period when the parts are in the position shown in Fig. 2, is relatively long while the period when the valve is lifted and the parts are brought together is relatively short. Thus, this long period is ample to let the oil flow through the restriction in between the ball and socket.

In operation, the flat side of the ball is at all times in contact with the end of the valve stem. The accumulation of oil in and around the contacting surfaces of the ball and valve stem is in many instances sufficient to hold the ball against the valve stem by reason of the capillary attraction, but it is preferred to also utilize the small spring for this purpose to positively insure this action. It will be noted that the socket is closed so that the oil does not flow through the socket but is trapped therein.

This construction has been found to be very advantageous in actual use, and a number of important features have been noted. For example, the usual tappet clearance is in the neighborhood of .007 of an inch, but with this construction there is no noise in the tappet operation where a clearance much greater than .007 occurs. For example, a test has shown that there is no tappet noise where the clearance is as great as .020. Moreover, the operation of the valve construction improves with use. This occurs by reason of the fact that in machining the ball and socket, certain irregularities are almost sure to occur so that certain high spots are present either in the ball, in the socket, or both. When first put into use, these high spots more or less break through the film of oil, and approximate a point to point contact, but after use the two parts are worn in so that the ball fits perfectly in the socket. There is no point to point contact but a surface to surface contact which does not break through the film of oil.

Moreover, the construction accommodates for inaccuracies in contact between the valve stem and push rod, as is shown in an exaggerated manner in Fig. 3. As shown in this figure the valve stem is imperfect, having a projecting part 20. This is compensated for by reason of the fact that the ball is cocked a little but still maintains the surface to surface contact and a quiet operation results. There are quite a number of causes for an imperfect contact of this nature, but they need not be gone into as one example will suffice to show the operation.

It is appreciated that different grades of oil may be used from time to time, but it has been found that the construction will work satisfactorily with all grades of oil whether light or heavy, as are commonly used in internal combustion engines. In this regard it may be pointed out that the construction is self-compensating for the expanding parts when they become heated. When the parts become hot and expanded the ball and socket fit a little closer together, but at the same time the oil becomes heated also so that the oil becomes less viscous.

Inasmuch as the ball is in contact at all times with the end of the valve stem, an irregular wear between the tappet and the valve stem is eliminated; also the compensating action of the ball for taking care of any irregularities in construction gives a true push action between the tappet and the valve stem so that there is no side slap action in the valve stem or push rod. The construction may be adjusted for clearance in a manner quite similar to the adjustment of the present day tappet and stem construction, by merely placing suitable gauge between the end of the valve stem and the flat surface of the ball, and this is accomplished by merely depressing the ball, thus compressing the spring 14. The spring 14 is a light spring which readily permits this operation and is not used to effect a cushion but is used solely to keep the ball in contact with the valve stem. The spring may even be dispensed with and the ball may be connected directly to the valve stem but so that it can twist with respect thereto.

A modified form of the invention is shown in Fig. 4 wherein the ball 10$^a$ and the cooperating socket 11$^a$ are appreciably less than half a hemisphere in construction. This form is found to also be satisfactory, and while the restriction to the flow of oil in and out of the socket is not present in the degree which it is present in the construction shown in Fig. 2, the ball and socket do make a surface to surface contact and the film of oil between the two acts as a cushion. In both forms of the invention the film of oil practically eliminates any actual metal to metal contact.

The construction as shown herein is one commonly found in internal combustion engines of the L-head or T-head type, but this construction may also be used on engines which employ valves otherwise located without requiring any change in the structure. It is within the invention to reverse the position of the ball member and its socket as regards the valve stem and push rod, as this is merely a reversal of parts.

I claim:

1. In a valve construction, the combination of a valve having a stem member, a push rod member, a socket in one of these members, a flat sided ball in the socket, means for maintaining the flat side of the ball in contact with the opposite member, means for retaining a quantity of oil adjacent the ball and socket, said first mentioned means being adapted to lift the ball partially from its socket when the push rod retracts from the stem, whereby the oil flows between the socket and ball member to provide an oil cushion between the ball and socket member.

2. In a valve construction, the combination of a valve having a stem member, a push rod member for actuating the valve, one of these members being provided with a socket, a flat sided ball in the socket, spring means in the socket tending normally to lift the ball from the socket and hold the same in contact with the other of the said members, means for retaining a quantity of oil adjacent the ball and socket member, the said members being coordinated so that when the push rod is retracted from the stem member there is a clearance between the ball and socket to permit the oil to flow in between the ball and socket to thus provide an oil cushion between the two.

3. In a valve construction, the combination of a valve having a valve stem, a push rod, means providing a socket in the end of the push rod, a flat sided ball in the socket having continuous contact with the end of the valve stem and having a clearance with regard to its socket when the push rod is retracted from the valve stem, and means for retaining a quantity of oil adjacent the ball and socket, some of which flows into the socket when the ball is cleared therefrom, whereby to provide an oil cushion between the two.

4. In a valve construction, the combination of a valve having a stem, a push rod slidably arranged to actuate the valve by contacting with the stem, means providing a closed socket in the end of the push rod which will retain a fluid, a ball member in the socket, means for normally lifting the ball from its socket and holding the same in contact with the valve stem, there being a clearance in the arrangement of parts so that the ball is lifted from the socket when the push rod is retracted from the stem, means for retaining a quantity of fluid adjacent the socket, some of which flows into the socket when the ball is so lifted therefrom, whereby to provide a liquid cushion between the ball and socket.

5. In a valve construction, the combination of a valve having a stem, a push rod slidably arranged to actuate the valve by contacting with the stem, means providing a closed socket in the end of the push rod which will retain a fluid, a ball member in the socket, means for normally lifting the ball from its socket and holding the same in contact with the valve stem, there being a clearance in the arrangement of parts so that the ball is lifted from the socket when the push rod is retracted from the stem, means for retaining a quantity of oil adjacent the socket, some of which flows into the socket when the ball is so lifted therefrom, whereby to provide a cushion between the ball and socket, said ball and socket being substantially hemispherical in shape to thus provide near the edges of the socket a restricted passageway between the ball and socket to thus effect relatively slow egress of oil from the socket when the push rod moves to bring the ball and socket together.

6. In a valve construction, the combination of a valve having a stem, a push rod provided with a socket in its end, a flat sided ball in the socket, said socket being provided with a well, a spring in this well contacting with the ball and for maintaining the flat side thereof in contact with the end of the valve stem, the parts being arranged to provide a clearance when the push rod is retracted from the valve stem, whereby such clearance permits the spring to lift the ball from its socket, means for retaining a quantity of oil adjacent the socket, some of which flows into the socket when the ball is lifted therefrom whereby an oil cushion is effected between the ball and socket when the push rod moves to bring the two together and actuate the valve.

In testimony whereof I affix my signature.

ADRIAN O. ABBOTT, Jr.